（12） United States Patent
Wegmann et al.

(10) Patent No.: US 9,538,443 B2
(45) Date of Patent: Jan. 3, 2017

(54) USER EQUIPMENT SHORT STAY REPORT

(75) Inventors: Bernhard Wegmann, Holzkirchen (DE); Ingo Viering, Munich (DE); Krzysztof Kordybach, Pulawy (PL); Richard Waldhauser, Munich (DE)

(73) Assignee: Nokia Solutions and Networks Oy, Espoo (FI)

( * ) Notice: Subject to any disclaimer, the term of this patent is extended or adjusted under 35 U.S.C. 154(b) by 224 days.

(21) Appl. No.: 14/238,219

(22) PCT Filed: Aug. 11, 2011

(86) PCT No.: PCT/EP2011/063868
§ 371 (c)(1),
(2), (4) Date: Feb. 11, 2014

(87) PCT Pub. No.: WO2013/020604
PCT Pub. Date: Feb. 14, 2013

(65) Prior Publication Data
US 2014/0200005 A1    Jul. 17, 2014

(51) Int. Cl.
*H04W 36/24* (2009.01)
*H04W 36/16* (2009.01)
*H04W 36/00* (2009.01)

(52) U.S. Cl.
CPC .......... *H04W 36/165* (2013.01); *H04W 36/24* (2013.01); *H04W 36/245* (2013.01); *H04W 36/0083* (2013.01)

(58) Field of Classification Search
CPC . H04W 36/0083; H04W 36/24; H04W 36/245
See application file for complete search history.

(56) References Cited

U.S. PATENT DOCUMENTS 8,570,981 B2 * 10/2013 Aziz .................. H04W 36/245
                                                        370/332
2010/0173626 A1    7/2010  Catovic et al.
2010/0173633 A1    7/2010  Catovic et al.
(Continued)

FOREIGN PATENT DOCUMENTS

KR     20100083236 A     7/2010
WO     WO 2011/023231 A1  3/2011

OTHER PUBLICATIONS

Huawei: "Rapid HO"; R3-102058; 3GPP TSG-RAN WG3 #69; Madrid, Spain, Aug. 23-27, 2010; pp. 1-6; 3rd Generation Partnership Project (3GPP); Mobile Competence Centre; 650, Route des Lucioles; F-06921 Sophia-Antipolis Cedex; France.
(Continued)

*Primary Examiner* — Asghar Bilgrami
(74) *Attorney, Agent, or Firm* — Harrington & Smith

(57) ABSTRACT

A second handover of a user equipment from a cell B to a cell C of a cellular communications network is successfully completed, wherein a successful completion of a first handover of the user equipment from a cell A of the cellular communications network to the cell B has immediately preceded the second handover. The second handover is determined as being a rapid handover at the cell B and/or the cell C based on a detection that the second handover of the user equipment has been initiated from the cell B to the cell C within a configurable period of time since the successful completion of the first handover, and the rapid handover is reported to the cell A.

18 Claims, 3 Drawing Sheets

(56) References Cited

U.S. PATENT DOCUMENTS

2010/0178922 A1* 7/2010 Han .................. H04W 36/245
455/436
2012/0088507 A1* 4/2012 Legg .................. H04W 36/245
455/436

OTHER PUBLICATIONS

ZTE: "Coverage and Capacity optimization"; R3-101542; 3GPP TSG RAN WG3 #68; Montreal, Canada, May 10-14, 2010; pp. 1-7; 3rd Generation Partnership Project (3GPP); Mobile Competence Centre; 650, Route des Lucioles; F-06921 Sophia-Antipolis Cedex; France.
Huawei: "Active mode Inter RAT ping pong"; R3-103001; 3GPP TSG RAN WG3 Meeting #69bis, Xi'an, China, Oct. 11-15, 2010; pp. 1-4; 3rd Generation Partnership Project (3GPP); Mobile Competence Centre; 650, Route des Lucioles; F-06921 Sophia-Antipolis Cedex; France.
Alcatel-Lucent: "Finalization of too early handovers by Ue measurements"; R3-100384; 3GPP TSG RAN WG3 Meeting #66bis; Valencia, Spain, Jan. 18-22, 2010; pp. 1-3; 3rd Generation Partnership Project (3GPP); Mobile Competence Centre; 650, Route des Lucioles; F-06921 Sophia-Antipolis Cedex; France.
3GPP TSG RAN WG3 Meeting #59 bis, Shenzhen, China, Mar. 31-Apr. 3, 2008, R3-080754, "Mobility Robustness Optimisation", Huawei, 5 pgs.
3GPP TSG-SA5 (Telecom Management), Meeting SA5#61, Nov. 17-21, 2008, Miami, USA, S5-082443 (listed as S5-082455 in the ISR), "Use case and requirement for Mobility Robustness Optimization", Samsung, 3 pgs.
3GPP TR 36.902 V9.3.1 (Mar. 2011), "$3^{rd}$ Generation Partnership Project; Technical Specification Group Radio Access Network; Evolved Universal Terrestrial Radio Access Network (E-UTRAN); Self-configuring and self-optimizing network. (SON) use cases and solutions (Release 9)", 21 pgs.
3GPP TS 36.300 V12.0.0 (Dec. 2013), "$3^{rd}$ Generation Partnership Project; Technical Specification Group Radio Access Network; Evolved Universal Terrestrial Radio Access Network (E-UTRA) and Evolved Universal Terrestrial Radio Access Network (E-UTRAN); Overall description; Stage 2 (Release 12)", 208 pgs.
3GPP TS 36.423 V12.0.0 (Dec. 2013), "$3^{rd}$ Generation Partnership Project; Technical Specification Group Radio Access Network; Evolved Universal Terrestrial Radio Access Network (E-UTRAN); X2 application protocol (X2AP) (Release 12)", 144 pgs.

* cited by examiner

200
USER EQUIPMENT SHORT STAY REPORT

BACKGROUND OF THE INVENTION

Field of the Invention

The present invention relates to mobile radio communications with focus on self optimizing networks and in particular mobility robustness optimization. Particularly, the present invention is concerned with so-called short stays, which are sometimes also referred to as "rapid" handover, where a UE is handed over from cell A to cell B, and cell B handovers the same user to another cell C shortly after.

Related Background Art

Prior art which is related to this technical field can e.g. be found in:

[1] 3GPP TS 36.300: "Evolved Universal Terrestrial Radio Access (E-UTRA) and Evolved Universal Terrestrial Radio Access Network (E-UTRAN); Overall description", Stage 2;

[2] 3GPP TR 36.902: "Evolved Universal Terrestrial Radio Access Network (E-UTRAN); Self-configuring and self-optimizing network (SON) use cases and solutions", Technical Report;

[3] A. Catovic et al., "Handover failure messaging schemes," US 2010/0173633 A1;

[4] A. Catovic et al., "Adaptation of handover parameters," US 2010/0173626 A1; and

[5] 3GPP TS 36.423: "Evolved Universal Terrestrial Radio Access Network (E-UTRAN); X2 application protocol (X2AP)," Technical Specification.

The following meanings for the abbreviations used in this specification apply:

3GPP 3rd generation partnership project
SON self optimizing networks
MRO mobility robustness optimization
RLF radio link failure
HO Handover
HOF handover failure
RCA root cause analysis
KPI key performance indicator
RAT radio access technology
UE user equipment
OAM operation, administration and maintenance
ECGI E-UTRAN cell global identification
E-UTRAN evolved UMTS terrestrial radio access network
UMTS universal mobile telecommunications system
PM performance management
NB node B
eNB evolved node B
IE information element
C-RNTI cell radio network temporary identity
ENUM enumeration
LTE long term evolution
RAN radio access network
RIM RAN information management
RNC radio network controller
BSC base station controller Conventionally, optimization of network configuration parameters in 2G or 3G networks is based on labor- and cost-intensive drive testing. For a first roll-out, network-wide default configuration parameters are used and if performance management counters are accumulating RLFs or even call drops in certain service areas, several optimization loops with drive testing are started to adapt parameters in a cell-specific manner.

The target of MRO is to automate the optimization of those network configuration parameters which are triggering a handover and comprise e.g. event thresholds, timers, etc., such that first and foremost radio link failures and handover failures are reduced and secondly also unnecessary handovers like ping pongs or short stays are prevented. The MRO procedure consists of two phases:

root cause analysis phase, where all needed information to analyze a mobility problem is brought together to generate corresponding cell or cell-pair specific KPI statistics; and correction phase, where based on the KPI statistics corresponding countermeasures are determined and measurement parameters triggering a HO are adjusted.

Methods are provided for root cause analysis of RLF afflicted mobility problems, e.g. RLF reports from UE and inter-eNB information exchange, such as RLF indication and handover report message. However, these methods are not applicable for unnecessary handovers like ping pongs or short stays, since there is no RLF. Though an end user does not sustain a serious deterioration of the service quality, unnecessary handovers should be avoided since they result in increased network signaling load.

A ping pong handover means that a UE is handed over from cell A to cell B, and cell B handovers the same user back to cell A shortly after. Ping pong is a special case of the short stay problem where the second "rapid" handover goes back to cell A. The cell A is able to get aware of this "ping pong" problem by checking UE history information which is provided with an HO preparation message. The cell A is responsible for this problem, since it initiated the first unnecessary handover and is able to administer and increment a corresponding KPI counter without additional information exchange among nodes. However, in case of short stays where the UE is handed over further to a third cell C after being very shortly connected with cell B, the "guilty" cell A is not getting aware of this "short stay" problem automatically as in the ping pong case.

The problem is that there is no MRO mechanism in terms of root cause analysis which provides the information of a "short stay" problem to the responsible cell, i.e. there are no means for figuring out and informing the responsible cell, which should administer a corresponding performance counter or KPI.

Furthermore, there is also no proper specified MRO approach for short stay detection, including ping pong as special case, in case of cell individual short stay timing criteria, i.e. different thresholds determining a short stay for cell A and cell B.

As described above, only RLF afflicted mobility problems are considered so far from MRO perspective. The ping pongs are basically detectable without information exchange, since the UE is coming back to the "guilty" cell, i.e. that cell responsible for the problem and where a corresponding KPI should be counted.

The prior art documents [1] to [4] provide a description of methods and messaging applied to detect mobility problems including ping pong assuming a common network-wide timing criterion. However, the detection of short stays has not been considered so far and there is no proper mechanism to manage a corresponding problem detection in the responsible cell.

SUMMARY OF THE INVENTION

The present invention aims at overcoming the above problems.

This is achieved by the methods and apparatuses as defined in the appended claims. The invention may also be implemented by a computer program product.

According to an aspect of the invention, a method is introduced which allows a unique detection of the short stay problem, including ping pong as special case, and notification of a responsible cell (cell A in the example above). For instance, a cell detecting the problem is able to figure out the responsible cell for that problem and in case of a short stay problem it is sending an information message to this responsible cell, including a corresponding information element reporting the problem case "short stay" or "rapid handover". If the two cells belong to different eNBs, an inter-node information exchange is executed. The message may also contain information about involved cells, namely both a target cell (cell B) to which a first HO was executed and a cell (cell C) to which a subsequent "rapid" was done afterwards.

The responsible cell, i.e. that cell which initiated the first handover, is getting informed about the short stay or rapid handover and is enabled to make mobility more robust by adapting its mobility related parameters such that in the future handovers are directly performed to cell C without short stay in cell B.

Moreover, in case of cell individual MRO thresholds like a short stay timing criterion also ping pong problems can be improved with the present invention.

The above and still further objects, features and advantages of the invention will become more apparent upon referring to the description and the accompanying drawings.

DESCRIPTION OF PREFERRED EMBODIMENTS

In the following, examples and embodiments of the present invention are described with reference to the drawings.

Figure 1:
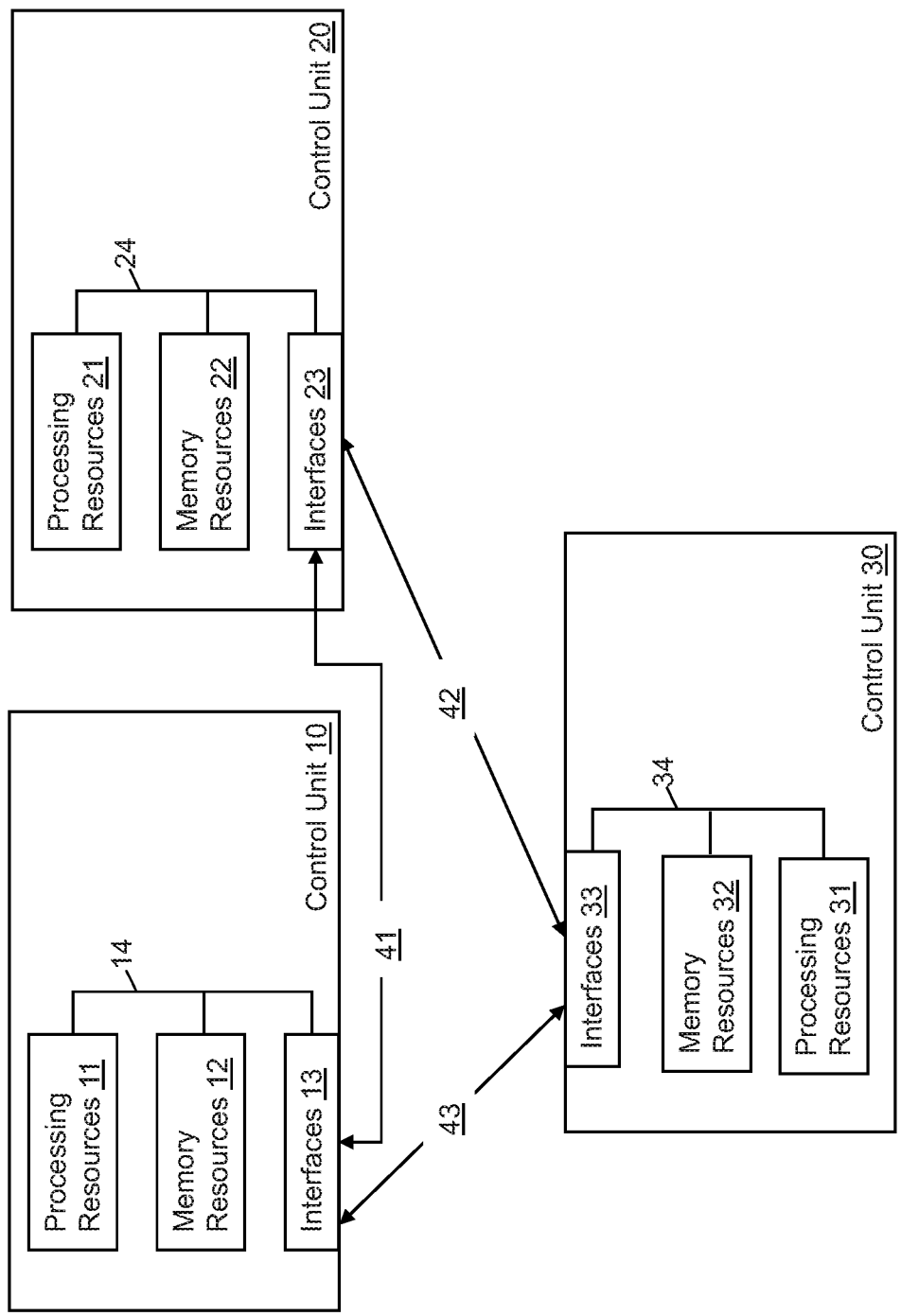
FIG. 1 shows a schematic block diagram illustrating a configuration of control units according to an embodiment of the invention.

As a preliminary matter before exploring details of various implementations, reference is made to FIG. 1 for illustrating a simplified block diagram of various electronic devices that are suitable for use in practicing the exemplary embodiments of this invention.

Control units 10, 20, 30 which may comprise base stations, such as eNBs of an E-UTRAN or controlling nodes as RNC or BSC of a radio access network in a 2G or 3G cellular communications network, respectively, each include processing resources 11, 21, 31, memory resources 12, 22, 32 that may store programs, and interfaces 13, 23, 33 which may include suitable radio frequency transceivers respectively coupled to one or more antennas (not shown) for bidirectional wireless communications over one or more wireless links. Moreover, the interfaces 13, 23, 33 may be provided for wireline links. The processing resources, memory resources and interfaces of the respective control units 10, 20, 30 are coupled by links 14, 24, 34 as shown in FIG. 1.

The control units 10 and 20 are coupled by a link 41, the control units 20 and 30 are coupled by a link 42, and the control units 30 and 10 are coupled by a link 43. The interfaces 13, 23, 33 and the links 41, 42, 43 may comprise at least one of an X2 interface and an S1 interface, and using the S1 interfaces for inter-RAT communication based on RIM.

The control unit 10 is assumed to be a control unit of a cell A (first cell) of the cellular communications network, and the control units 20 and 30 are assumed to be control units of a cell B (second cell) and a cell C (third cell) of the cellular communications network, respectively.

The terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and printed electrical connections, as well as by the use of electromagnetic energy, such as electromagnetic energy having wavelengths in the radio frequency region, the microwave region and the optical (both visible and invisible) region, as non-limiting examples.

At least one of the memory resources 12, 22, 32 is assumed to store a program which includes program instructions that, when executed by the associated processing resources 11, 21, 31, enable the control unit to operate in accordance with the exemplary embodiments of this invention, as detailed below. Inherent in the processing resources is a clock to enable synchronism among the various apparatus for transmissions and receptions within the appropriate time intervals and slots required, as the scheduling grants and the granted resources/subframes are time dependent.

In general, the exemplary embodiments of this invention may be implemented by computer software stored in the memory resources 12, 22, 32 and executable by the corresponding processing resources 11, 21, 31, or by hardware, or by a combination of software and/or firmware and hardware in any or all of the devices shown.

The memory resources may comprise any type suitable to the local technical environment and may be implemented using any suitable data storage technology, such as semiconductor-based memory devices, magnetic memory devices and systems, optical memory devices and systems, fixed memory and removable memory. The processing resources may comprise any type suitable to the local technical environment, and may include one or more of general purpose computers, special purpose computers, microprocessors, digital signal processors (DSPs) and processors based on a multi-core processor architecture, as non-limiting examples.

As mentioned above, the present invention deals with the root cause analysis of the so-called short stays which are sometimes also referred to as "rapid" handover, where a UE is handed over from cell A to cell B of a cellular communications network, and cell B handovers the same user to another cell C of the cellular communications network shortly after. In some cases, one of the two handovers could be saved by a direct handover from cell A to cell C.

Figure 2:
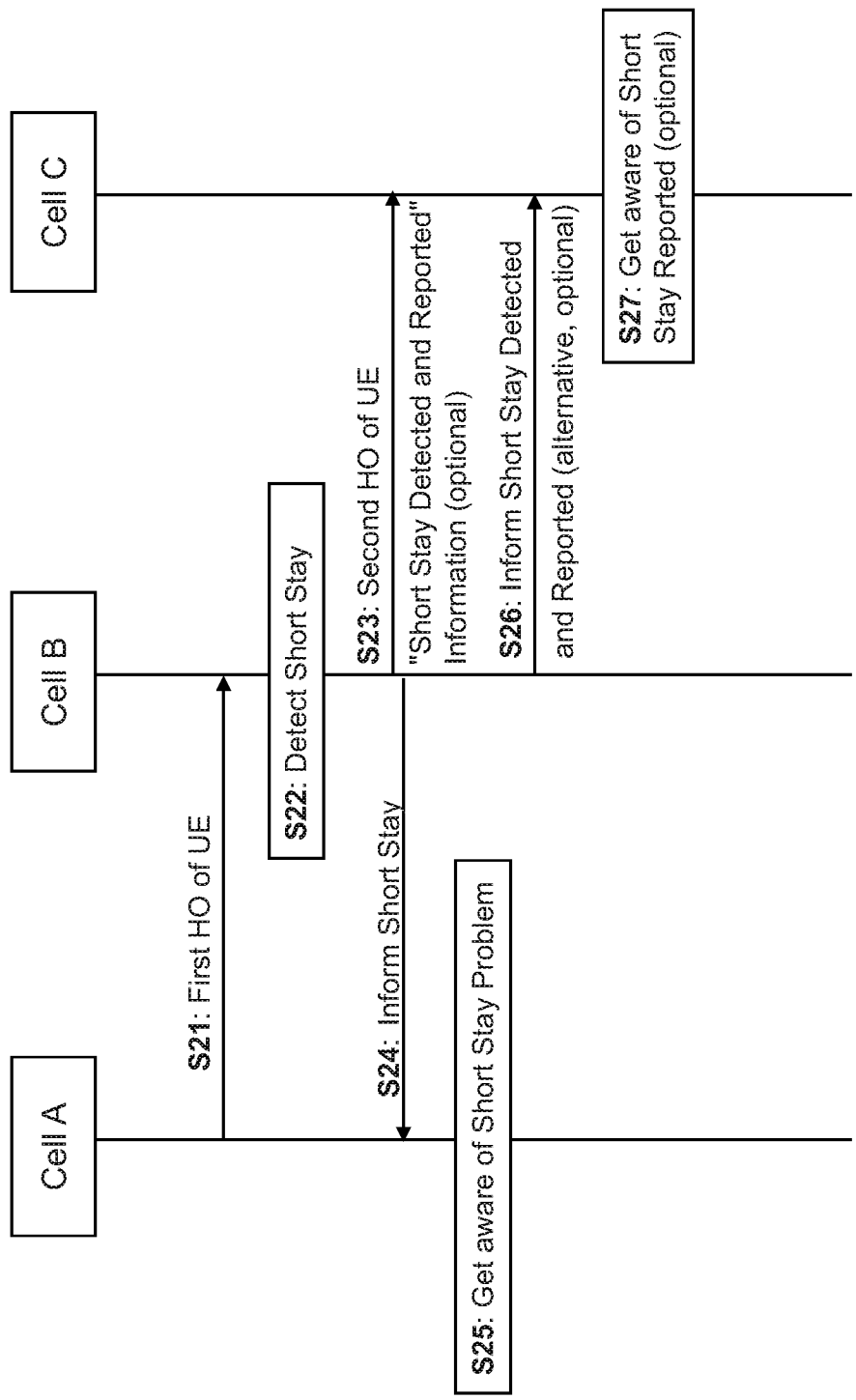
FIG. 2 shows a signaling diagram illustrating a procedure of detecting and reporting short stay/rapid handover according to an embodiment of the invention representing a first implementation example.

FIG. 2 shows a signaling diagram illustrating a procedure of detecting and reporting short stay/rapid handover according to an embodiment of the invention representing a first implementation example. In this first implementation example, cell B informs cell A of the rapid handover.

In step S21, a first handover of a UE from cell A to cell B is successfully completed. Cell B detects in step S22 that the UE is handed over to new target cell C immediately after its arrival from cell A (step S23). In other words, in step S22 cell B, e.g. an eNB comprising the control unit 20, detects a short stay (rapid handover). This detection may be solved eNB internally by tracing and exploring a time span between completion of the first handover from cell A and an initiation of a second handover towards cell C. This time span may be compared with a certain cell-specific MRO related threshold THRES_SHORT_STAY, which may be configured by an operator.

In other words, in step S22 the second handover is determined at cell B as being a rapid handover by detecting that the second handover of the UE has been initiated from cell B to cell C within a very short period of time since the successful completion of the first handover, i.e. the stay in cell B is shorter than a corresponding configurable MRO threshold. The detection and determination may be performed by the processing resources 21 and memory resources 22 of the control unit 20. In step S24 the rapid handover is reported from cell B to cell A e.g. by using the interfaces 13, 23 and the link 41 shown in FIG. 1. In step S25 cell A gets aware of the short stay/rapid handover problem and may increment a performance management counter relating to a key performance indicator set up for mobility robustness optimization. The identification and increment may be performed by the processing resources 11 and memory resources 12 of the control unit 10.

Communications between cell B and cell A may be performed using an X2 interface.

The advantage of the first implementation example is that
  cell B can perform the above-described time measurement rather accurate,
  an X2 interface is present between cell A and cell B in case of intra-LTE mobility, while cell C is not necessarily a direct neighbor of cell A and, therefore, X2 is not guaranteed, and
  short stay/rapid handover detection in the cell affected with it and the annotation of the problem there readable by other cells (e.g. in the UE history information) prevent another cell to report the problem case again, e.g. by informing cell C that the short stay problem has been detected and reported already by cell B; in case the UE experiences a second short stay at cell C, cell C can detect and report this second short stay as described above.

Cell C is able to detect the short stay by retrieving UE history information included in a handover request message sent from cell B to cell C for initiating the second handover. In order to avoid double reporting of the short stay by both cells B and C, information may be included in the UE history information which indicates the short stay in cell B and that the "short stay" has been reported to cell A. There are several options to provide this information to cell C, for instance, by a separate new information element in addition to the UE history information as shown in step S23 or a new X2 message as shown in step S26. The messages in steps S23 and S26 may be sent using the interfaces 23 and 33 and the link 42, which may comprise an X2 interface. The above information may be set in the UE history information or the new X2 message may be generated by the processing resources 21 using the memory resources 22 of the control unit 20.

The UE history information comprises a list of last visited cells where the last visited cell on top of the list is a current cell sending out a specified handover request message including this UE history information. For example, a fourth additional information element called for instance "Short stay detected" may be added to "Last Visited Cell Information" of the UE history information:
  Global Cell ID
  Cell Type
  Time UE stayed in Cell
  Short stay detected (NEW) (conditional)
This new IE "Short stay detected" may include further information, e.g.:
  Coming from cellID (ECGI) (optional)
  Short stay cellID (ECGI) (optional)
  Forwarded to cellID (ECGI) (optional)
  {Reported; not reported} (ENUM) (mandatory)
  Identification used for the UE when it was served by the cell identified by the 'Short stay cellID' (e.g. C-RNTI), (optional),
  Identification used for the UE when it was served by the cell identified by the 'Coming from cellID' (e.g. C-RNTI), (optional),
  HO conditions (optional)
    UE Measurements (including location information, if available) when the UE arrived at the cell identified by the 'Short stay cellID'
    Own cell measurements
    Neighbor cell measurements In the case of the first implementation example in which cell B reports the detected short stay/rapid handover to cell A, a flag "Reported" is set in the UE history information which is part of the specified handover request message sent from cell B to cell C for initiating the second handover as schematically shown in step S23. Based on this information received in the specified handover request message, or based on similar information included in a new X2 message as shown in step S26, cell C gets aware in step S27 that the short stay of the UE at cell B has been reported. This detection may be performed by the processing resources 31 and the memory resources 32 of the control unit 30.

The reporting of the short stay/rapid handover by cell B in step S24 may be carried out as follows.

Cell B, i.e. that cell which serves the UE for a very short time period before handing over the UE, sends a specified handover report message or another, newly specified message, to cell A. If the specified handover request message described in document [5] is used, it is extended with a type "short stay", or "rapid handover" in addition to existing types "too early HO", "HO to wrong cell". Furthermore, current fields "Failure cell ECGI", "Re-establishment cell ECGI" have to be re-interpreted appropriately since the current definition is based on events with involved connection failures. For example, the semantics description is updated such that "Source cell ECGI" is the actual problematic cell where the handover report is addressed to (Coming from cellID), "Failure cell ECGI" is the cell with the short dwell time (Short stay cellID), and "Re-establishment cell ECGI" is the cell where the UE has been forwarded to after short stay (Forwarded to cellID).

Alternately, existing IEs may be renamed to correspond to more general context in which the message can be used.

Moreover, besides these re-interpreted information elements new optional information elements can be used in the handover report message to provide additional information related to the reported short stay event, which may be useful for the receiving cell to improve its short stay event handling. These additional information may for example comprise:

time the UE stayed in the cell B,
    Identification used for the UE when it was served by cell B (e.g. C-RNTI),
    Identification used for the UE when it was served by cell A (e.g. C-RNTI),
    HO conditions (optional)
        UE Measurements (including location information, if available) when the UE arrived to the cell identified by the 'Short stay cellID'; in this implementation variant the information element "Failure cell ECGI" holds the value of the 'Short stay cellID'.
        Own cell measurements
        Neighbor cell measurements Another alternative using the handover report message to inform cell A about the short stay incidence is to define a new conditionally used information element, e.g. 'Short Stay Information' (or 'Rapid Handover Information'), which contains the same information as listed above for the UE history information in combination with the information element "Short stay detected" excluding the information element '{Reported; not reported} (ENUM)'. The presence of the handover report type "short stay" (or "rapid handover") indicates to an eNodeB receiving the handover report message that it has to ignore the content of the other information elements related to the types "too early HO", "HO to wrong cell".

Setting of the above information for reporting the rapid handover may be performed by the processing resources 21 and memory resources 22 of the control unit 20.

Figure 3:
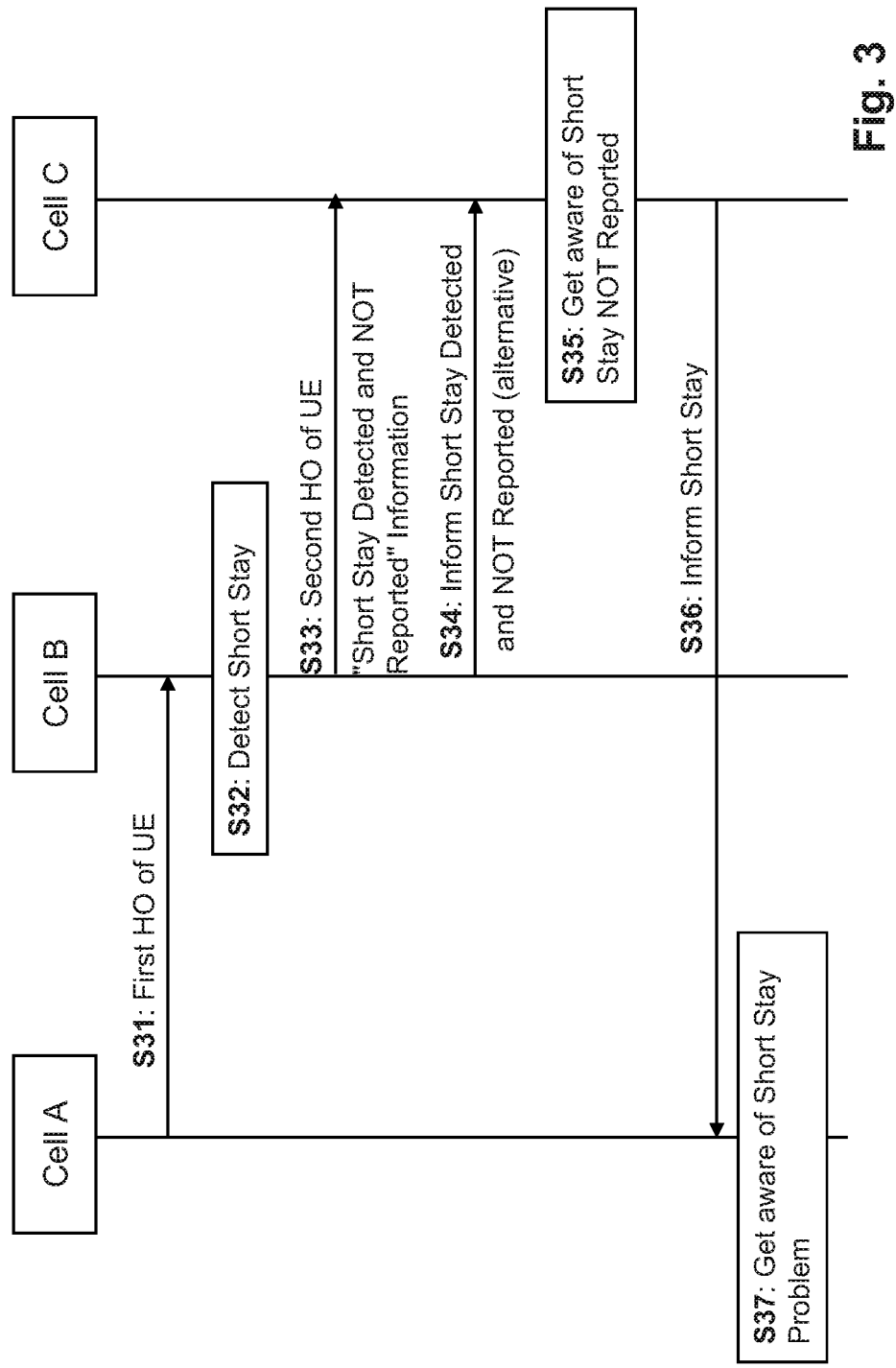
FIG. 3 shows a signaling diagram illustrating a procedure of detecting and reporting short stay/rapid handover according to an embodiment of the invention representing a second implementation example.

FIG. 3 shows a signaling diagram illustrating a procedure of detecting and reporting short stay/rapid handover according to an embodiment of the invention representing a second implementation example. In this second implementation example, cell C informs cell A of the rapid handover.

In step S31, a first handover of a UE from cell A to cell B is successfully completed. Cell B detects in step S32 that the UE is handed over to new target cell C immediately after its arrival from cell A (step S33). That is, the problem detection still happens in cell B as described above and cell C is informed in step S33 with a "Short stay detected" IE in UE history information as illustrated above, having a flag "not reported". Alternatively, a new message may be sent from cell B to cell C including information which indicate to cell C that the short stay has been detected in cell B but not reported (step S34). A reported "Time UE stayed in Cell" as part of "Last Visited Cell Information" might not be sufficient to detect the problem in cell C in case of cell-specific thresholds THRES_SHORT_STAY which might be different in cell B and C. Therefore, the IE "Short stay detected" in the UE history information or the new message is used. The UE history information or the new message may be set/generated by the processing resources 21 of the control unit 20 using the memory resources 22. The messages in steps S33 and S34 may be sent using the interfaces 23 and 33 and the link 42, which may comprise an X2 interface.

The same approach may be applied in case of ping pong where the second "rapid" handover of the UE is back to cell A. This approach guarantees a proper ping pong detection in case of cell-specific thresholds THRES_SHORT_STAY in cells B and A.

Based on the UE history information including the IE "Short stay detected" cell C is getting aware of the short stay or rapid handover in step S35. The detection may be performed by the processing resources 31 and the memory resources 32 of the control unit 30.

In step S36 cell C informs cell A of the short stay/rapid handover e.g. using the interfaces 33 and 13 and the link 43 which may comprise an X2 interface or an S1 interface. Provided that an X2 interface exists between cell A and cell C, cell C may send a handover report message with the same interpretation of the information as described above or a new message indicating the short stay as mentioned above. The preparation of the handover report message or the new message may be performed by the processing resources 31 and the memory resources 32 of the control unit 30.

In step S37 cell A is getting aware of the short stay problem as described above with reference to step S25.

According to an embodiment of the invention, a cell which is responsible for a short stay of a user equipment can be informed about the short stay and a corresponding PM counter can be incremented in the responsible cell during the RCA phase of the MRO. Hence, the short stay problem can be considered in the correction phase of the MRO and measurement parameters triggering an HO can be adjusted to alleviate the short stay problem.

Reporting of the short stay by cell B to cell A and identification of the short stay by cell A as described in the first implementation example may also be adopted in case of ping pong even when cell individual short stay thresholds are applied.

According to an aspect of the invention, an apparatus, comprising e.g. the control unit 20 and/or the control unit 30 in FIG. 1, includes first means for successfully completing a second handover of a user equipment from a second cell (e.g. cell B in FIGS. 2 and 3) to a third cell (e.g. cell C in FIGS. 2 and 3) of a cellular communications network, wherein a successful completion of a first handover of the user equipment from a first cell (e.g. cell A in FIGS. 2 and 3) of the cellular communications network to the second cell has immediately preceded the second handover, second means for determining the second handover as being a rapid handover at the second cell and/or the third cell based on a detection that the second handover of the user equipment has been initiated from the second cell to the third cell within a configurable period of time since the successful completion of the first handover, and third means for reporting the rapid handover to the first cell. The first, second and third means may be implemented by the processing resources 21, 31, memory resources 22, 32 and interfaces 23, 33.

The apparatus, e.g. the control unit 20, may include fourth means for detecting the rapid handover and the third means for reporting the rapid handover to the first cell by using an interface between the first cell and the second cell. The fourth means may be implemented by the processing resources 21, the memory resources 22 and the interfaces 23. Alternatively, the apparatus, e.g. the control unit 30, may include the third means for reporting the rapid handover to the first cell by using an interface between the first cell and the third cell.

The above-mentioned interface may comprise at least one of an X2 interface and an S1 interface.

For reporting the rapid handover the apparatus, e.g. the control unit 20 and/or the control unit 30, may comprise fifth means for preparing a message which is introduced for reporting the rapid handover to the first cell, and/or for preparing a specified handover report message for reporting the rapid handover to the first cell. The fifth means may be implemented by the processing resources 21, 31, memory resources 22, 32 and interfaces 23, 33.

For preparing the specified handover report message, the apparatus may comprise sixth means for setting a handover report type which is introduced to the specified handover report message, to identify the rapid handover.

Moreover, the apparatus may comprise seventh means for setting specified information elements identifying a failure cell and a re-establishment cell, which are renamed, to identify the second cell as the failure cell and the third cell as the re-establishment cell in the specified information elements in the specified handover report message to be used for reporting the rapid handover to the first cell.

Alternatively, the apparatus may comprise eighth means for setting specified information elements identifying a failure cell and a re-establishment cell, whose semantics description is extended, to identify the second cell as the failure cell and the third cell as the re-establishment cell in the specified information elements in the specified handover report message to be used for reporting the rapid handover to the first cell.

Alternatively, the apparatus may comprise ninth means for setting information elements which are introduced to the specified handover report message, to identify the second cell and the third cell.

The sixth to ninth means may be implemented by the processing resources 21, 31, memory resources 22, 32 and interfaces 23, 33.

The apparatus, e.g. the control unit 20, may further comprise tenth means for setting an information element which is introduced to a handover request for the second handover, which is issued from the second cell to the third cell, to indicate the rapid handover detected by the second cell, or for preparing a message which is introduced for informing the rapid handover detected by the second cell to the third cell, and sending the message to the third cell. The tenth means may be implemented by the processing resources 21, memory resources 22 and interfaces 23.

The apparatus may further comprise eleventh means for setting information in the information element, indicating whether the rapid handover has been reported to the first cell, or for preparing the message to indicate whether the rapid handover has been reported to the first cell. The eleventh means may be implemented by the processing resources 21, memory resources 22 and interfaces 23.

In turn, the apparatus, e.g. the control unit 30, may comprise the second means for determining the rapid handover from the information element introduced to the handover request for the second handover, or for determining the rapid handover from the prepared message.

Moreover, the apparatus may comprise twelfth means for determining whether the rapid handover has been reported to the first cell, from the information set in the information element, or from the prepared message, and the third means for report the rapid handover to the first cell in case the information or the prepared message indicates that the rapid handover has not been reported to the first cell.

The twelfth means may be implemented by the processing resources 31, memory resources 32 and interfaces 33.

The information element indicating the rapid handover detection and reporting may be part of history information for the user equipment.

According to an aspect of the invention, an apparatus, comprising e.g. the control unit 10 shown in FIG. 1, includes means for receiving, at the first cell, a message identifying the rapid handover, and means for incrementing a performance management counter relating to a key performance indicator set up for analyzing rapid handover. The means for receiving and the means for incrementing may be implemented by the processing means 11, the memory means 12 and the interfaces 13.

It is to be understood that the above description is illustrative of the invention and is not to be construed as limiting the invention. Various modifications and applications may occur to those skilled in the art without departing from the true spirit and scope of the invention as defined by the appended claims.

The invention claimed is:

1. A method comprising:
   successfully completing a second handover of a user equipment from a second cell to a third cell of a cellular communications network, wherein a successful completion of a first handover of the user equipment from a first cell of the cellular communications network to the second cell has immediately preceded the second handover;
   determining the second handover as being a rapid handover at the second cell and/or the third cell based on a detection that the second handover of the user equipment has been initiated from the second cell to the third cell within a configurable period of time since the successful completion of the first handover; and
   reporting the rapid handover to the first cell using a specified handover report message comprising setting specified information elements identifying a failure cell and a re-establishment cell, which are renamed or whose semantics description is extended, to identify the second cell as the failure cell and the third cell as the re-establishment cell in the specified information elements in the specified handover report message.

2. The method of claim 1, wherein the second cell detects the rapid handover and reports the rapid handover to the first cell by using an interface between the first cell and the second cell, or the third cell reports the rapid handover to the first cell by using an interface between the first cell and the third cell.

3. The method of claim 2, wherein the interface comprises at least one of an X2 interface and an S1 interface.

4. The method of claim 1, wherein reporting the specified handover report message comprises:
   setting a handover report type which is introduced to the specified handover report message, to identify the rapid handover.

5. The method of claim 1, comprising:
   setting an information element which is introduced to a handover request for the second handover, which is issued from the second cell to the third cell, to indicate the rapid handover detected by the second cell, or
   preparing a message which is introduced for informing the rapid handover detected by the second cell to the third cell, and sending the message to the third cell.

6. The method of claim 5, wherein the introduced information element comprises information indicating whether the rapid handover has been reported to the first cell, or wherein the message further indicates whether the rapid handover has been reported to the first cell.

7. The method of claim 5, wherein the introduced information element indicating the rapid handover detection and reporting is part of history information for the user equipment.

8. The method of claim 6, wherein the third cell reports the rapid handover to the first cell in case the information or the message indicates that the rapid handover has not been reported to the first cell.

9. A method comprising:
receiving, at a first cell of a cellular communications network, a specified handover report message identifying a rapid handover of a user equipment from a second cell to a third cell of the cellular communications network, wherein a successful completion of a first handover of the user equipment from the first cell to the second cell has immediately preceded the second handover, wherein the specified handover report message comprises specified information elements identifying a failure cell and a re-establishment cell, which are renamed or whose semantics description is extended, to identify the second cell as the failure cell and the third cell as the re-establishment cell in the specified information elements in the specified handover report message; and
incrementing a performance management counter relating to a key performance indicator set up for analyzing rapid handover.

10. A computer program product including a program embodied on non-transitory computer readable medium for a processing device, comprising software code portions for performing the steps of claim 1 when the program is run on the processing device.

11. An apparatus comprising:
at least one processor; and
at least one memory including computer program code, the at least one memory and the computer program code configured to, with the at least one processor, cause the apparatus to perform at least the following:
successfully complete a second handover of a user equipment from a second cell to a third cell of a cellular communications network, wherein a successful completion of a first handover of the user equipment from a first cell of the cellular communications network to the second cell has immediately preceded the second handover;
determine the second handover as being a rapid handover at the second cell and/or the third cell based on a detection that the second handover of the user equipment has been initiated from the second cell to the third cell within a configurable period of time since the successful completion of the first handover; and
report the rapid handover to the first cell using a specified handover report message comprising setting specified information elements identifying a failure cell and a re-establishment cell, which are renamed or whose semantics description is extended, to identify the second cell as the failure cell and the third cell as the re-establishment cell in the specified information elements in the specified handover report message.

12. The apparatus according to claim 11, the at least one memory and the computer program code further configured to, with the at least one processor, cause the apparatus to:
detect the rapid handover at the second cell and report the rapid handover to the first cell by using an interface between the first cell and the second cell; or
determine the rapid handover at the third cell and report the rapid handover to the first cell by using an interface between the first cell and the third cell.

13. The apparatus according to claim 11, the at least one memory and the computer program code further configured to, with the at least one processor, cause the apparatus to:
set a handover report type which is introduced to the specified handover report message, to identify the rapid handover.

14. An apparatus comprising:
at least one processor: and
at least one memory including computer program code the at least one memory and the computer program code configured to, with the at least one processor, cause the apparatus to perform at least the following:
receive, at a first cell of a cellular communications network, a specified handover report message identifying a rapid handover of a user equipment from a second cell to a third cell of the cellular communications network, wherein a successful completion of a first handover of the user equipment from the first cell to the second cell has immediately preceded the second handover, wherein the specified handover report message comprises specified information elements identifying a failure cell and a re-establishment cell, which are renamed or whose semantics description is extended, to identify the second cell as the failure cell and the third cell as the re-establishment cell in the specified information elements in the specified handover report message; and
increment a performance management counter relating to a key performance indicator set up for analyzing rapid handover.

15. The apparatus according to claim 11, the at least one memory and the computer program code further configured to, with the at least one processor, cause the apparatus to:
set an information element which is introduced to a handover request for the second handover, which is issued from the second cell to the third cell, to indicate the rapid handover detected by the second cell, or
prepare a message which is introduced for informing the rapid handover detected by the second cell to the third cell, and sending the message to the third cell.

16. The apparatus of claim 15, wherein the introduced information element comprises information indicating whether the rapid handover has been reported to the first cell, or wherein the message further indicates whether the rapid handover has been reported to the first cell.

17. The apparatus of claim 15, wherein the introduced information element indicating the rapid handover detection and reporting is part of history information for the user equipment.

18. The apparatus of claim 16, wherein the third cell reports the rapid handover to the first cell in case the information or the message indicates that the rapid handover has not been reported to the first cell.

* * * * *